3,845,189
HYDROMETALLURGICAL RECOVERY OF
NICKEL VALUES
Marilyn Miller, Leonhard A. Goeller, and Laurence G. Stevens, Des Plaines, Ill., assignors to Universal Oil Products Company, Des Plaines, Ill.
No Drawing. Filed June 7, 1972, Ser. No. 263,360
Int. Cl. C22b 1/00, 3/00, 23/04
U.S. Cl. 423—150
7 Claims

ABSTRACT OF THE DISCLOSURE

In the hydrometallurgical recovery of a metal value from ores or the like, the method of improving subsequent extraction of said metal value with ammoniacal solution, which comprises pretreating said ore or the like with dilute acid at about 50° to about 400° F. and thereafter subjecting the pretreated ore or the like to a reducing treatment utilizing a reducing gas at a temperature of from about 1000° to about 1800° F. In another embodiment, the undissolved residue from the extraction with ammoniacal solution is treated with dilute acid to recover additional quantity of the metal value and the enriched acid solution preferably is utilized as the first mentioned dilute acid for use in said pretreating.

BACKGROUND OF THE INVENTION

In the hydrometallurgical recovery of metal values from a metal bearing source such as ore, slag, scrap, etc., the crushed and ground metal bearing material is subjected to a roasting at elevated temperature in contact with a reducing atmosphere, after which the treated metal-containing material is subjected to oxidative leaching with an ammoniacal solution to dissolve the metal and separate the same from undissolved solvents. The solution then is treated in conventional manner to recover the metal as, for example, precipitation, solvent extraction, evaporation of solvent, etc. For example, in the recovery of nickel, the solution is treated with steam to drive off ammonia and to precipitate nickel carbonate which then is treated further to obtain the appropriate form of nickel or utilized as such.

DESCRIPTION OF THE INVENTION

The present invention is predicated on the discovery that improved recovery of metal is obtained when the metal bearing source is first pretreated with dilute acid at a temperature of from about 50° to about 400° F. and preferably from ambient (50°–100° F.) to 250° F. The reasons for the improved results obtained by the pretreatment herein described are not fully understood. For example, when dilute hydrochloric acid solution is used to pretreat a nickel bearing ore, the X-ray fluorescence scatter patterns obtained by electron probe analysis do not show the presence of nickel chloride. The acid is retained in the ore and apparently serves to improve the subsequent processing and extraction steps of the process.

The process of the present invention may be used for recovery of metal values from ore, slag, scrap or other metal bearing sources and, in the interest of brevity, reference to ore in the present specification and claims also includes such other suitable metal bearing sources. The present invention is particularly applicable to the recovery of nickel from such sources. However, it may be used for the recovery of other metal values including, for example, cobalt, copper, manganese and other metals soluble in ammoniacal solutions but not necessarily with equivalent results. The present invention is of particular advantage for use in the extraction of nickel from lateritic nickel ores. In addition, the process of the present invention offers the advantage of permitting high nickel recovery from low iron, garnieritic type ores which heretofore could be processed satisfactorily only in the higher temperature pyrometallurgical method. The recovery of nickel from the low iron content ores is even further improved when using the pretreatment of the present invention in conjunction with other features as will be hereinafter described in detail.

Any suitable dilute acid pretreatment is used in the present invention. Particularly preferred acids include dilute aqueous solutions of hydrogen chloride, hydrogen bromide and sulfuric acid. Other acids comprise hydrogen iodide, hydrogen fluoride, phosphoric acid, bromoacetic acid, o-bromobenzoic acid, alpha-bromopropionic acid, chloroacetic acid, chlorobenzoic acid, alpha-chloropropionic acid, dichloroacetic acid, fumaric acid, maleic acid, malonic acid, oxalic acid, picric acid, trichloroacetic acid, etc. In another embodiment, the acid may be used in admixture with alkali metal chloride including, for example, sodium chloride, potassium chloride, lithium chloride, rubidium chloride, cesium chloride, etc., alkaline earth metal chlorides including, for example, calcium chloride, strontium chloride, barium chloride, etc., sea water, acidified sea water, etc. It is understood that the different acid solutions are not necessarily equivalent.

The dilute acid solution generally will contain the acid in a concentration of from about 0.1% to about 15% or slightly more and preferably from about 1% to about 7% by weight. The dilute acid solution will be used in a sufficient amount to accomplish the desired purpose, which amount will vary with the particular ore being processed. In general, the amount of solution may be within the range of from about 10% to about 150% and preferably from about 20% to about 100% by weight of the ore.

Pretreatment of the ore with the dilute acid is effected in any suitable manner. Generally, the ore will be crushed and ground to particles within the size range of from about 8 to 500 mesh or more. The dilute acid solution is sprayed, poured, etc., onto the crushed and ground ore, or the ore particles are passed into a body of the dilute acid solution, preferably with intimate mixing. In another method, dry acid gas or vapor may be atomized or otherwise contacted with moist ore particles. It is understood that any suitable method of intimately contacting the acid with the ore may be used in accordance with the present invention.

Following the pretreatment with dilute acid, the ore is dried at a temperature of less than about 500° F. and preferably from ambient to 250° F. for a time of from about ½ to 48 hours or more and preferably from 1 to 20 hours. Generally, shorter times are used with higher temperatures and vice versa. The conditions of drying should be controlled to avoid volatilization and removal of the acid. Following the drying, the ore is again crushed and ground to suitable particle size, which generally will be in the size range heretofore set forth.

The pretreated ore now is subjected to reducing treatment in the presence of a reducing gas and at a temperature of from about 1000° to about 1800° F. and preferably from about 1200° to about 1600° F. Conventional reducing zones may be utilized including, for example, multiple hearth furnace, fluo-solids roaster, Herreshoff furnace, etc. The chemical reduction of the ore is effected by means of a suitable reducing gas mixture which, here again, is of the general type used in conventional processes. Any suitable reducing gas mixture may be used and preferably comprises a mixture of hydrogen, carbon monoxide, carbon dioxide and water vapor. The gas mixture may come from any suitable source, including producer gas, gases formed by the combustion of city gas, gases formed by combustion of oil, etc. The specific gas mixture will be selected to effect the desired reduction of the nickel compounds. An illustrative gas mixture comprises a $CO:CO_2$ ratio within the range of about 0.1:1 to 10:1, a $CO:H_2$ ratio within the range of about 0.1:1 to 10:1 and $H_2:H_2O$ vapor ratio within the range of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas. In another method, solid reducing agents, such as coke, etc., may be used.

Further improvements are obtained when the reducing is effected in the presence of added hydrogen halide or precursor thereof, solid sulfur or gaseous sulfur compound. The added hydrogen halide is used in a concentration of from about 0.01% to about 10% or more and preferably from about 0.1% to about 5% by weight of the ore. Any hydrogen halide gas may be used and preferably comprises hydrogen chloride gas, with hydrogen bromide gas being of the next preference. In another embodiment, the hydrogen halide gas comprises hydrogen iodide or hydrogen fluoride but not necessarily with equivalent results. The hydrogen halide may be added in any suitable manner including direct addition of the hydrogen halide gas into the roasting zone, stripping of the hydrogen halide from a solution thereof, etc. In a particularly preferred method, the reducing gas is bubbled through an aqueous solution of the hydrogen halide and carried into the reducing zone in this manner, preferably with preheating prior to charging into the reducing zone. The solution of hydrogen halide may range from 1% to saturated (37%) or even a supersaturated solution, with a solution containing 25% to 35% hydrogen chloride being of particular advantage. In another embodiment, the free halogen, chlorine, bromine, iodine or fluorine may be injected directly into the roasting zone wherein, upon contact with the reducing gas, will be rapidly converted to the corresponding hydrogen halide.

In still another method, a precursor of hydrogen halide may be added to the roasting zone and therein converted to hydrogen halide. In this embodiment, the precursor should not be in the form of the alkali or alkaline earth metal halide but may be in acidic or nonbasic form. Illustrative precursors include boron trichloride, boron tribromide, boron trifluoride ($BF_3$), boron bromide diiodide ($BBrI_2$), boron dibromide iodide ($BBr_2I$), etc. Other precursors comprise carbon tetrachloride, carbon tetrabromide, carbon tetrafluoride, carbon tetraiodide, phosphorus tribromide, phosphorus pentabromide, phosphorus trichloride, phosphorus pentachloride, phosphorus trifluoride, phosphorus pentafluoride, phosphorus triiodide, phosphorus dibromide trichloride ($PBr_2Cl_3$), phosphorus dibromide trifluoride ($PBr_2F_3$), silicon tetrabromide, silicon tetrachloride, silicon tetrafluoride, silicon tetraiodide, etc.

In still another embodiment, the precursor may comprise a hydrocarbon halide as, for example, methyl chloride, methylene chloride (dichloromethane), methyl bromide, methylene bromide, methyl fluoride, methylene fluoride, methyl iodide, methylene iodide, ethyl chloride, vinyl chloride, dichloroethylene, ethyl bromide, vinyl bromide, dibromomethylene, vinyl fluoride, vinyl iodide and higher molecular weight hydrocarbyl halides which generally will not contain more than about 20 carbon atoms per molecule. At the high temperatures encountered in the roasting step, the precursor will be decomposed to liberate the hydrogen halide or the halogen which soon is reduced to the hydrogen halide. It is understood that the free halogen and the other precursors are not necessarily equivalent for use in the present invention. When desired, a mixture of the hydrogen halides and/or precursors may be employed.

When sulfur is added to the reducing step, it will be used in sufficient concentration to serve the desired purpose and generally will be within the range of from about 0.1% to 5% and preferably from about 0.15% to 3% by weight of the ore. In a preferred embodiment, the sulfur is introduced as free sulfur and may be as powder, flour, granules, pellets, etc., or molten or otherwise liquefied sulfur or as sulfur vapors. In some cases, the sulfur may be in the form of combined sulfur, such as ammonium sulfide, but not with equivalent results. The sulfur should not be in the form of alkali or alkaline earth metal sulfates because these do not appear to be satisfactory. The sulfur may be added directly to the reducing zone or it may be commingled with the pretreated ore prior to entering the reducing zone and conveniently by being added during the drying of the pretreated ore. The sulfur and ore are intimately mixed in any suitable manner.

When a gaseous sulfur compound is added to the reducing step, it may be added in a concentration of from about 0.01% to about 10% or more and preferably from about 0.1% to about 5% by weight of the ore. Any suitable gaseous sulfur compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the added gaseous sulfur compound preferably is normally gaseous. However, in another embodiment it may be normally liquid and vaporized prior to use or allowed to vaporize under the conditions existing in the reducing zone. In another embodiment, the added sulfur compound is a hydrocarbyl sulfide including, for example, methyl mercaptan, ethyl mercaptan, propyl mercaptan, butyl mercaptan, pentyl mercaptan, hexyl mercaptan, etc., but generally containing not more than about 20 carbon atoms per molecule.

The gaseous sulfur compound may be supplied to the reducing zone in any suitable manner. When as a gas or vapor, it may be charged directly into the reducing zone. In another method a solution, preferably aqueous, of the sulfur compound may be prepared, and the reducing gas bubbled therethrough to carry the sulfur compound into the reducing zone. When the added sulfur compound is normally liquid, the reducing gas may be bubbled therethrough or through a solution thereof in a suitable solvent or the liquid may be charged directly into the reducing zone. In still another method, the ore may be contacted with the sulfur compound prior to being introduced into the reducing zone. It is understood that these different methods are not necessarily equivalent and that the preferred method will be selected with regard to the particular system being employed. It also is understood that a mixture of the gaseous sulfur compounds may be employed.

In still another embodiment, a mixture of the hydrogen halide, sulfur and/or gaseous sulfur compound may be used. Each of these ingredients may be used in the concentrations hereinbefore set forth and introduced in substantially the same manner as described hereinbefore. In another embodiment, when a mixture of these added ingredients is used, the concentration of each may be somewhat less than when used alone, which lesser amount may comprise from about 20% to about 80% of the amount specifically set forth above. As will be illustrated in the appended examples, the use of one or more of these added ingredients in conjunction with the dilute acid pretreatment results in even further improvement and such further improvement may be attributed to a synergistic effect.

As another advantage to the process of the present invention, the reducing step is effected in unusually short times. High recoveries were obtained in 30 minute roasting times, in contrast to the requirements of greater than one hour when the reducing treatment is effected in the absence of the pretreatment or of the added ingredients. However, when advantages appear therefor, longer roast times may be used. Also, as another advantage to the present invention the pretreatment, crushing, grinding, drying and reducing steps may be conducted in conventional apparatus. Also, as another advantage, the hydrometallurgical process is effected at lower temperatures than the pyrometallurgical processes of the prior art and, therefore, avoids the objections inherent in the higher temperature reduction processes. Also, for economical reasons, the acid gases and vapors, including hydrogen halide gas, sulfur vapors, etc., evolved in the reducing step are recovered in any suitable manner and reused in the process or used for any other suitable purpose.

The reduced ore particles are withdrawn from the reducing zone and then processed in conventional manner for the hydrometallurgical extraction of the nickel. The effluent from the reduction zone is first cooled several hundred degrees and then is passed into one or more quench zones. In a preferred embodiment, the quench liquid is the ammonum carbonate leachng solution. However, the quenching must be effected in the absence of air. In other words, oxygen or air should not contact the reduced particles until the temperature of the particles is below about 200° F. because of the possibility of oxidation of the metal to the oxide or to other oxygen containing compounds. It is understood that other suitable quenching solutions may be employed but, as hereinbefore set forth, economical advantages appear for the use of the leaching solution for this purpose.

Any suitable ammoniacal leaching solution may be employed and preferably comprises aqueous ammonium carbonate solution containing from about 2% to about 25% and preferably from about 3% to about 15% $NH_3$ and from about 1% to about 15% and preferably from about 1.5% to about 7.5% $CO_2$. As still another advantage to the process of the present invention, the leaching solution comprises a lower concentration of $NH_3$ than generally is utilized in the prior art, thus effecting an additional economy in the present process. The leaching is effected at a temperature below 200° F. and conveniently ambient temperature. Ambient pressure or superatmospheric pressure may be used but generally will not exceed about 100 p.s.i.g. As hereinbefore set forth, the leaching is effected in the presence of oxygen, which may comprise ambient air when the leaching is effected in open tanks or vessels or it may comprise air introduced into closed zones. It is understood that, in the place of air, oxygen or other suitable oxygen containing source may be utilized.

The reduction effected in accordance with the present invention facilitates extraction of the nickel, and particularly separation thereof from iron or iron compounds. Also, it appears to help in the separation of nickel from cobalt in the leaching solution. The extraction is effected in any suitable manner, and generally by passing the ore countercurrently to the leaching solution in a plurality of leaching and thickening zones. Here again, conventional apparatus may be used.

The solution of nickel withdrawn from the leaching and thickening zones is then treated in any suitable manner to precipitate the nickel and to recover the same. In one method, this is accomplished by steaming to precipitate the nickel carbonate and to volatilize off ammonia, $CO_2$ and water. The process of the present invention permits recoveries of nickel greater than 80%, in contrast to the recoveries of less than 50–70% normally obtained in the prior art methods. Furthermore, as hereinbefore set forth, low iron content ores may be treated economically to recover nickel therefrom, in contrast to the former requirement of using the high temperature pyrometallurgical process or in not being able to effect such recovery economically.

In still another embodiment of the present invention, the undissolved solids separated in the ammoniacal leach step is water washed to recover ammoniacal compounds, which are reused in the system, and the solids then are given a dilute acid after treatment to recover the metal values still retained in the ore prior to dumping. The after treatment with dilute acid is effected in any suitable manner, including the methods hereinbefore set forth for the pretreatment, and utilizes the same dilute acid solution and quantity thereof as also described for the pretreatment. In fact, in a particularly preferred embodiment, at least a part of the dilute acid soltion used in the after treatment is utilized in the pretreatment. Suitable additions or withdrawals will be made if such modification is required to balance the dilute acid solution for use in the pretreatment. The reuse of the after treating acid in the pretreating step offers numerous advantages. In the first place, this method serves to recover additional metal values and to recycle them within the process for subsequent recovery in the extraction step. While the actual quantity of metal values recovered in this manner may be considered as small, the large volume of solids being treated in this manner represents a substantial total amount of recovered metals. As still another advantage, the after treatment will serve to supply $FeCl_2$ to the system which, after the system lines out, will be at a uniform level. The $FeCl_2$ facilitates in the separation and recovery of the nickel and this benefit is accomplished without the expense of purchasing and handling an outside source of the chemical. In another modification, the ammoniacal leaching step need not be as severe as otherwise because residual metal values will be subsequently recovered in the dilute acid after treatment. Furthermore, the after treating eliminates the prior art methods of further treating the solids to separate the metal values and the additional step of recovering the metal values in a separate processing. Again, conventional washing and thickening apparatus may be used.

The following examples are introduced to illustrate further the novelty and utility of the present invention but not with the intention of unduly limiting the same.

EXAMPLE I

A series of experimental runs was made in the following manner. These runs were made with a lateritic nickel ore having the following assay:

TABLE I

| | Percent |
|---|---|
| Ni | 1.39 |
| Co | 0.10 |
| Fe | 25.1 |
| MgO | 5.3 |
| $SiO_2$ | 29.8 |

In each run, 25 g. of the ore were weighed into a tared ⅞" I.D. quartz combustion tube, purged with reducing gas to eliminate any oxygen which may have been contained in the tube, and then placed into a split tube furnace at a temperature of 900° F. A reducing gas was passed over the sample, while the temperature was increased to 1500° F. over a period of 30 minutes. The gas composition was as follows:

TABLE II

| Gas: | CFM |
|---|---|
| CO | 0.01 |
| $H_2$ | 0.015 |
| $N_2$ | 0.03 |
| $CO_2$ (+$H_2O$) | 0.03 |

In the control run, the ore was charged directly to the combustion tube. In the runs using the pretreatment, the ore samples were slurried with 25 ml. of about 4% hydrochloric acid solution, well stirred and then dried overnight (16–20 hours) at 230° F., following which the pretreatment ore was charged directly into the combustion tube. As hereinbefore set forth, based on assay of the treated ore, essentially all of the $Cl^-$ was retained in the ore. The reducing gas was passed through a bubbler to add water vapor and then charged at a rate of about 0.08 CFM directly into the combustion tube.

When the temperature in the reducing zone reached 1500° F., the gas mixture was replaced by a flow of only nitrogen, and the tube cooled to room temperature. The reduced ore then was weighed, transferred in a nitrogen atmosphere and slurried with 200 mls. of an ammoniacal ammonium carbonate solution. The slurry was agitated vigorously at ambient temperature under slight $O_2$ pressure for 2½ hours and filtered. The filtrate then was assayed for nickel content to determine the percent extraction.

The following table reports the results of a control run made without the dilute acid pretreatment and of a corresponding run in which the ore was first pretreated in the manner described above.

TABLE III

| | Pretreatment | Percent Ni extraction |
|---|---|---|
| Run number: | | |
| 1 | No | 71.6 |
| 2 | Yes | 90.0 |

It will be noted that the pretreatment of the ore served to increase the Ni recovery by more than 18%.

EXAMPLE II

Another series of runs was made in substantially the same manner as described in Example I except that the reducing treatment also was effected in the presence of HCl vapor. In these runs, the reducing gas was bubbled through an aqueous HCl solution of about 29% prior to being charged to the combustion tube. It is estimated that about 0.7 to 1 g. of HCl was charged to the system in this manner.

The following table repeats the results of Run No. 1, which is the control run, and reports the results of a run using the HCl gas addition without pretreatment of the ore and a run made with added HCl and pretreatment of the ore in the same manner as described in Example I.

TABLE IV

| | Pretreatment | Added HCl vapor | Percent Ni extraction |
|---|---|---|---|
| Run number: | | | |
| 1 | No | No | 71.6 |
| 3 | No | Yes | 89.5 |
| 4 | Yes | Yes | 94.4 |

From the data in the above table, it will be seen that the addition of the hydrogen chloride to the combustion zone considerably increased the nickel recovery. However, the pretreatment and the added HCl vapor increased the nickel recovery to over 94%, which is greater than obtained by either step alone.

EXAMPLE III

This example reports the evaluations made in substantially the same manner as described in Example I except that 1% by weight of solid powdered sulfur was added to the ground ore sample and mixed therein prior to charging the sample into the combustion tube. In the evaluation made using both the pretreatment step and added sulfur, the pretreatment was effected in the same manner as described in Example I and, after drying, the sulfur was admixed with the ore. In both cases, the sulfur was at a concentration of about 1% by weight of the ore.

These evaluations made with samples of the same ore as described in Example I are reported in the following table. Here again, for comparative purposes, the control run is repeated in the table.

TABLE V

| | Pretreatment | Added sulfur | Percent Ni extraction |
|---|---|---|---|
| Run number: | | | |
| 1 | No | No | 71.6 |
| 5 | No | Yes | 80.1 |
| 6 | Yes | Yes | 91.9 |

EXAMPLE IV

Another series of evaluations was made using the ore as described in Example I and utilizing both the sulfur addition and HCl addition, with and without pretreatment in the same manner as described in the previous examples. The results of these evaluations, as well as a repeat of the control run for comparative purposes, are shown in the following table.

TABLE VI

| | Pretreatment | Added Sulfur | Added HCl vapor | Percent Ni extraction |
|---|---|---|---|---|
| Run number: | | | | |
| 1 | No | No | No | 71.6 |
| 7 | No | Yes | Yes | 91.3 |
| 8 | Yes | Yes | Yes | 94.4 |

From the data in the above table, it will be seen that the use of both the added sulfur and added HCl vapor increased the nickel extraction but that this recovery was even further increased by the use of the pretreatment in conjunction with the other two additives.

EXAMPLE V

In this example, the amount of dilute acid solution was varied. These runs were made in the same manner as described in Example I except that 10 ml. and 15 ml. of about 4% HCl solution were used. The ores from the pretreatment were dried overnight at 230° F. The data reported in the following table for these runs should be compared with Run No. 2 in Example I, which is repeated in the following table, along with Run No. 1, for comparative purposes.

In addition, the concentration of the HCl solution and the different quantities also were evaluated. The results of these evaluations are also included in the following table.

TABLE VII

| | Pretreatment | | Percent Ni extraction |
|---|---|---|---|
| | Ml. | Percent acid | |
| Run number: | | | |
| 1 | No | No | 71.6 |
| 2 | 25 | About 4 | 90.0 |
| 9 | 15 | do | 89.0 |
| 10 | 10 | do | 87.2 |
| 11 | 75 | About 1 | 90.3 |
| 12 | 25 | do | 88.8 |

From the data in the above table, it will be seen that improvement also is obtained when the amount and/or concentration of the acid solution is varied.

In another evaluation, the ore pretreated with 25 ml. of the 4% HCl solution was dried overnight at room temperature. When evaluated in the same manner as described above, this run (Run No. 13) resulted in nickel extraction of 94.6%. It will be noted that this is higher than the 90% obtained in the same manner when the ore was dried at 230° F. as reported in Run No. 2.

EXAMPLE VI

Another series of evaluations was made in which different acid solutions were used in the pretreatment. These evaluations were made with the same ore and in the same manner as described in Example I except for the different acid solutions as set forth in the following table. In all cases, except for Run No. 1, 25 ml. of acid solution was used in the pretreatment and the ore was dried overnight at 230° F. For comparative purposes, the results of Run Nos. 1 and 2 are repeated in the table.

TABLE VIII

| Run number | Acid solution | Percent Ni extraction |
|---|---|---|
| 1 | No | 71.6 |
| 2 | About 4% HCl | 90.0 |
| 14 | About 3% HBr | 91.9 |
| 15 | About 3% $H_2SO_4$ | 86.2 |
| 16 | About 3% $H_2SO_4$ plus about 3% NaCl | 85.3 |

From the data in the above table, it will be seen that all acid pretreatments served to increase the nickel recovery. In this particular evaluation, it appears that the HBr solution is preferred for higher nickel recovery.

EXAMPLE VII

Another evaluation was made in the same manner as described in Example I except that the pretreatment was made using 25 ml. of 1% HCl in synthetic sea water and the ore was dried overnight at 230° F. This pretreatment resulted in 88.5% nickel extraction (Run No. 17). This may be compared with the results obtained in Run No. 12 in Example V in which the pretreatment consisted of 25 ml. of 1% HCl and resulted in 88.8% nickel extraction.

EXAMPLE VIII

This example describes the results made in the same manner as described in Examples I, II and III but using an ore of much lower iron content and, accordingly, more difficult to process for the recovery of nickel. This ore is a lateritic nickel ore of the following assay:

TABLE IX

| | Percent |
|---|---|
| Ni | 1.81 |
| Co | 0.041 |
| Fe | 10.1 |

As shown in the following table, the pretreatment, when used, comprised 25 ml. of about 4% HCl solution. The drying of the pretreated ore was varied as shown in the table.

TABLE X

| Run number | Added Sulfur | Added HCl gas | Pretreatment | Drying procedure | Percent Ni extraction |
|---|---|---|---|---|---|
| 18 | No | No | No | No | 48.1 |
| 19 | No | No | About 4% HCL | Room temp. over the weekend and 230° F. for 1 hour | 82.0 |
| 20 | Yes | Yes | No | No | 81.8 |
| 21 | Yes | Yes | About 4% HCL | Room temp. over the weekend and 230° F. for 1 hour | 89.2 |
| 22 | Yes | Yes | About 4% HCL | Room temp. for about 20 hours and 230° F. for 1 hour | 91.7 |

Here again, it will be noted that the nickel recovery was increased from less than 50% to over 80% and as high as 91.7% when using the pretreatment of the present invention.

EXAMPLE IX

In this example, the ore described in Example I is pretreated, dried, roasted and leached in the same manner as described in Example I except that the acid solution used for the pretreatment is first used to after treat the remaining solids from the ammoniacal leaching. This should increase the nickel recovery from the control run of 71.6% (Run No. 1) to greater than 90.5%. Thus, in addition to the various advantages heretofore described for using the acid solution from the after treating for the pretreatment, an increase in nickel recovery is obtained.

We claim as our invention:

1. In the hydrometallurgical recovery of nickel from a nickel bearing source in which treated metal-containing material is subjected to oxidative leaching with an ammoniacal solution to dissolve the metal, the improvement which comprises pretreating said nickel bearing source at a temperature of from 50° to 250° F., with an aqueous solution of a hydrogen halide, said hydrogen halide concentration in said solution being from about 0.1% to about 15%, the amount of said hydrogen halide solution being from about 10% to about 150% by weight of the nickel bearing source, and thereafter subjecting the pretreated nickel bearing source to a reducing treatment utilizing a reducing gas at a temperature of from about 1,000° to about 1800° F., to provide a reduced nickel bearing source.

2. The method of claim 1 further characterized in that reduced nickel-bearing source is treated to extract nickel with an ammoniacal solution, said treatment providing ammoniacal solution containing nickel and an undissolved residue, and thereafter treating the undissolved residue with an aqueous solution of a hydrogen halide, said hydrogen halide concentration in said solution being from about 0.1% to about 15% to dissolve additional quantity of said nickel to form an enriched aqueous hydrogen halide solution.

3. The method of claim 2 in which at least a portion of the resultant enriched aqueous hydrogen halide solution is utilized is pretreating said nickel bearing source.

4. The method of claim 1 in which the amount of said hydrogen halide solution is from about 20% to about 100% by weight of the nickel bearing source.

5. The method of claim 1 in which said hydrogen halide solution is an aqueous hydrogen chloride solution of from about 1% to about 7% concentration.

6. The method of claim 1 in which said hydrogen halide solution is an aqueous hydrogen bromide solution of from about 1% to about 7% concentration.

7. The method of claim 1 in which said reducing treatment is effected in contact with added hydrogen halide present in a concentration of .01 to about 10% by weight of the nickel bearing source.

References Cited

UNITED STATES PATENTS

| 3,244,513 | 4/1966 | Zubryckyj | 75—119 |
| 3,100,700 | 8/1963 | Hills | 75—119 |
| 3,466,167 | 9/1969 | Illis | 75—103 |
| 3,232,750 | 2/1966 | Wesolowski | 75—103 X |
| 1,825,211 | 9/1931 | Schlecht | 423—32 |
| 2,197,185 | 4/1940 | Kissock | 75—117 |
| 3,453,101 | 7/1969 | Takahashi et al. | 75—119 |

FOREIGN PATENTS

| 1,008,196 | 10/1965 | Great Britain | 75—119 |
| 594,431 | 3/1960 | Canada | 75—111 |

OSCAR R. VERTIZ, Primary Examiner

B. E. HEARN, Assistant Examiner

U.S. Cl. X.R.

75—103, 119